United States Patent [19]
Canty et al.

[11] Patent Number: 5,230,556
[45] Date of Patent: Jul. 27, 1993

[54] LIGHTING AND VIEWING UNIT

[75] Inventors: Thomas M. Canty, Williamsville; Jon M. Venturin, Lewiston; Gary K. Walck, Sanborn, all of N.Y.

[73] Assignee: J. M. Canty Associates Inc., Tonawanda, N.Y.

[21] Appl. No.: 942,042

[22] Filed: Sep. 8, 1992

[51] Int. Cl.$^5$ .............................................. G03B 15/03
[52] U.S. Cl. ........................................ 362/32; 362/3; 362/101; 354/63
[58] Field of Search ................. 354/63; 362/3, 16, 32, 362/101

[56] References Cited

U.S. PATENT DOCUMENTS 4,974,094  11/1990  Morito ................................. 362/32
5,162,906  11/1992  Yorita et al. ........................ 362/3

Primary Examiner—Albert J. Makay
Assistant Examiner—L. Heyman
Attorney, Agent, or Firm—James J. Ralabate

[57] ABSTRACT

A unit for viewing and supplying light or radiant energy to the interior of a vessel that has a front fused glass window. The light and camera-viewing means see the interior of a vessel through this fused glass window which provides a substantially corrosion-proof seal across the entire distal portion of the unit. The light and camera-viewing means are pointed into the interior of the vessel in substantially the same direction.

19 Claims, 4 Drawing Sheets

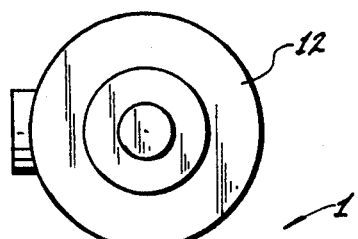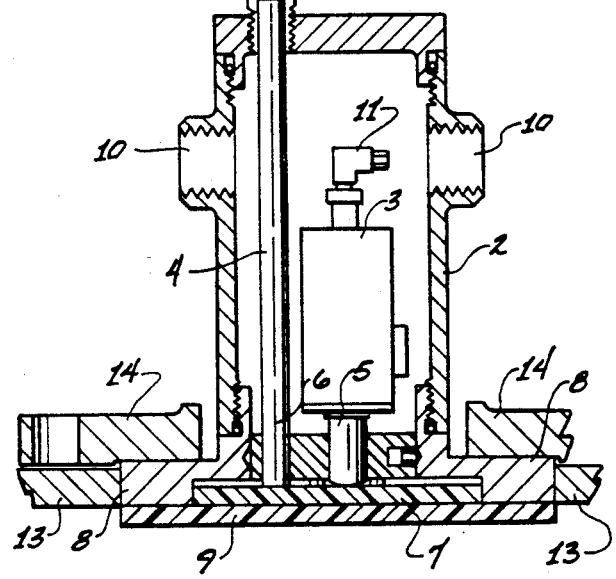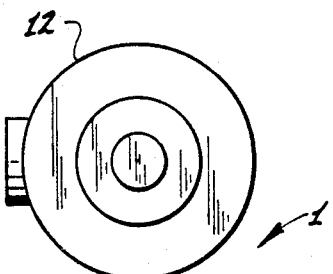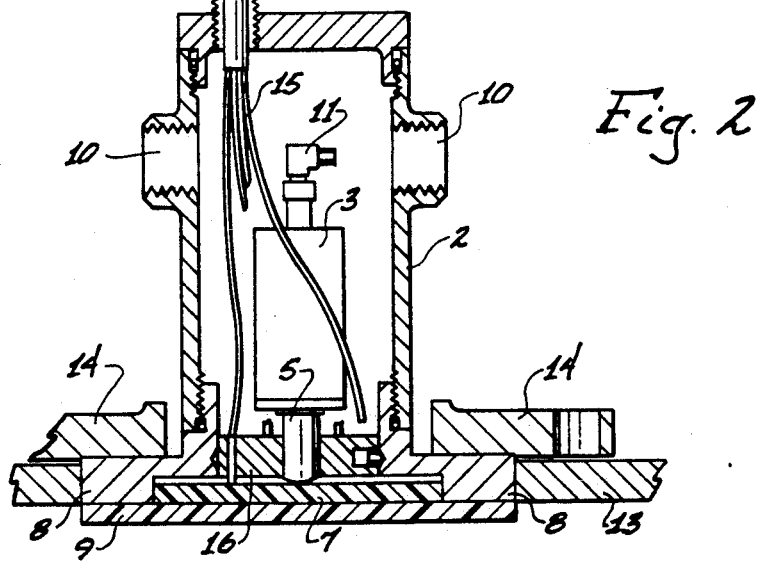
Fig. 1
Fig. 2

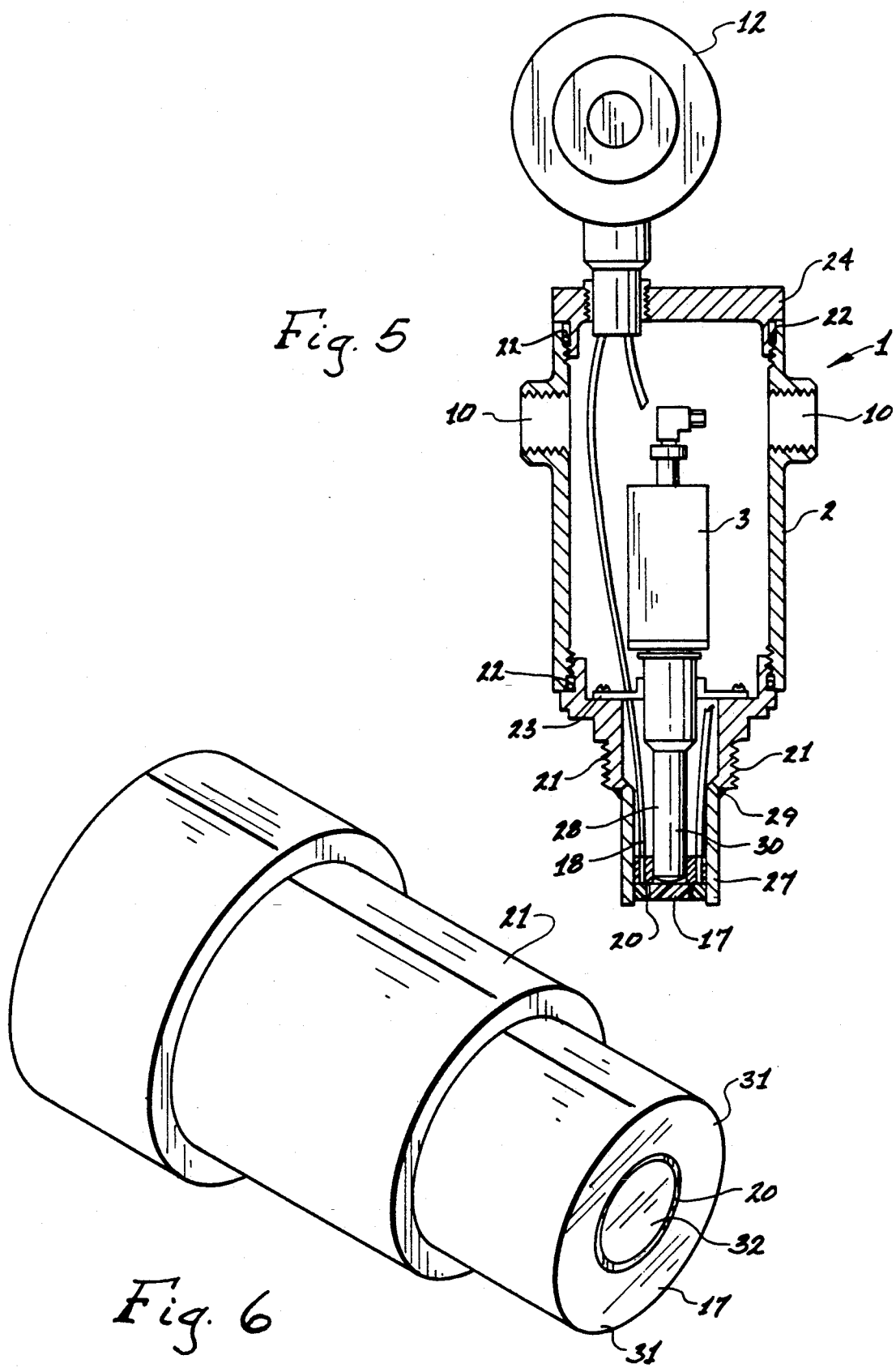

1

LIGHTING AND VIEWING UNIT

This invention relates to means for viewing the interior of a vessel and, more particularly, to a unit combining both lighting and viewing means.

BACKGROUND OF THE INVENTION

It is known to use various viewing means for both direct and remote viewing of the interior of vessels such as high pressure vessels and reaction vessels. In several embodiments the easiest way to view the interior of a vessel is to place a viewing port on a side of the vessel. Many of these viewing ports are adapted to receive connecting units which can be attached to the port and provide a direct view into the vessel's interior. Other units that can be connected provide a safety glass viewing window more structurally sound especially for use on the walls of high pressure vessels. Such a viewing window is disclosed in U.S. Pat. No. 4,809,862 issued to Thomas M. Canty. Other earlier U.S. patents disclosing viewing window units of various constructions are U.S. Pat. Nos. 2,744,487; 3,299,851; 3,837,226 and 4,245,566.

In addition to providing better interior lighting and safer viewing units, remote viewing means have been introduced to the industry. It had been recognized that it is very desirable to provide a system for viewing the interior of vessels at remote locations by the use of viewing cameras that not only provide instant viewing but can also allow recording of data at a safe location away from the vessel. This recorded data can be later used with appropriate means to analyze the activity that took place in the vessel. Viewing cameras that afforded this type of viewing and recording are the type disclosed and claimed in U.S. Pat. No. 4,977,418 also issued to Thomas M. Canty.

A serious problem that was recognized was that the camera unit used often would be internally directed to areas of poor lighting. Lighting units were then introduced into these systems which utilized a different port or a portion of the same port within the vessel wall. However, existing process vessels in many instances had only one access port available for camera or other installations such as lighting. The dimensions of a camera and light units required an 8-inch port to accommodate both at the same location. However, unfortunately, most ports or nozzles are not that large. The heretofore used systems often resulted in situations where the light did not adequately illuminate the camera's viewing area to its maximum extent. This was because each viewing and lighting unit was mounted through a different port and was directed differently.

Prior art devices did not adequately solve these below-noted problems:

(A) Sightglasses—Other glass windows provide unsafe viewing and no illumination. There are in existence glass viewports with lights mounted over half the window but they do not provide effective lighting and hinder view due to reflection off the glass surfaces into the viewer's eye. Furthermore, dirt can build up reducing illumination and view and heat of the light can act in a detrimental way upon the glass by creating uneven thermal stresses or detempering tempered glass. By mounting a light in this manner, half of the viewing area of the window is lost.

(B) Camera/Sightglass—Mounting a camera over a sightglass next to a light created the same problems as in (A) above but to a greater extent due to the fact that a typical camera (CCD or tube type) does not pick up an image as well as the human eye. Consequently, it is necessary to introduce more light into the vessel but this causes washout in the camera due to reflection off the window surfaces. If window size is large enough to avoid substantial reflection into the lens, the window diameter limits the process pressures to which such a system can be applied. Further limitations of all-glass windows are described in J. M. Canty U.S. Pat. No. 4,809,862. Limitations of prior art viewing windows and prior art cameras are described as follows in J. M. Canty U.S. Pat. No. 4,977,418.

A serious drawback to the use of these viewing windows is the possibility of failure or rupturing of these windows when used in a high pressure or high temperature system. Personnel using or in the vicinity of these windows could be be seriously inujured if the windows fail to withstand the internal pressure generated within the reaction vessel. Also, electrical equipment in a light or camera could cause an explosion if the viewport failed or blew out. To correct this drawback, a safety glass viewing window was provided in U.S. Pat. No. 4,809,862 (Canty). Canty provided a novel safety viewing window that was substantially safer and more structurally sound for use in a high pressure-high temperature vessel.

To extend the safety of these type devices a viewing of the interior of high pressure process vessels through a remote location at a safe distance from the vessel is highly desirable. There are situations where explosion potential exists during the use of these vessels and optimum safety can be afforded by removing personnel from the area of the vessel location. At the same time window viewing of the interior activity of a reaction (or other) vessel can only provide instant viewing information. For example, if it was desired to play back a foaming operation or reaction process to determine color changes, reaction levels or densities or other relevant factors, instant viewing through a window would not provide such an opportunity. It is highly desirable to provide a system for viewing the interior of such vessels at a remote location by the use of a viewing camera that can not only provide instant viewing but can also allow recording of data for later study or by the use of appropriate computer programs and digital information fully analyze the activity taking place or that earlier took place. A camera viewing could afford substantial advantages in addition to safety than are presently provided by viewing windows for direct personal viewing. There have been some attempts in both (A) standard viewing and (B) hazardous area viewing to utilize cameras for this purpose.

(A) In standard viewing in a high pressure/high temperature system, users have been limited to makeshift methods. Generally, to view the interior of a vessel at a remote location, the user would have to mount a camera onto an existing sightglass window. Any suitable camera may be used. They would then encounter some or all of the following problems that would render the system ineffective:

1. The sightglass and lens if not housed properly would become dirty due to dirt external to the vessel thereby limiting the view.

2. The process fluid or vapors would leak out or flow out due to a sightglass breaking or leaking. This would then destroy the electronics making the system inoperative. Breakage of the glass viewport could expose the electronics and allow problems to develop.

3. Reflection from room lighting would cause the vessel view to disappear if not provided with proper housing. While some systems rely upon purged air, Applicant's particularly designed system does not require this.

(B) Hazardous area viewing to date in industry has been performed by using a nitrogen-purged housing. The nitrogen purge is provided to eliminate and dilute hazardous vapors and prevent them from exploding. The nitrogen-purged housing is made of thin gauge metal with a window that the CCD Camera sees through. The limiting factors in the design are:

1. Purging is a continuous cost of operation.
2. Instrumenting the purge gas and piping the purge gas is very expensive and limits the locations where the camera can be mounted.
3. The gasketed window that the CCD Camera looks through is fragile and subject to breakage. Not only is there maintenance and replacement cost but there is also a major safety hazard created if the purge controls do not operate properly.
4. Hazardous area viewing of a high pressure area has not been attempted due to the combination of problems from 1, 2 and 3 above. One would currently have to use a purge camera housing on a sightglass and suffer from all of the problems mentioned above.

The structures of a camera device on a reaction vessel could easily become corroded and could fail. Uneven glass loading due to uneven bolt or gasket stresses can cause cracking and leakage. Also, corrosive chemicals during extended usage could cause failure of these mounting structures or failure of the camera being used. The camera systems of the prior art are cumbersome, oversized and in many instances tend to reflect light and cause image distortion. In addition, focusing and manipulating of the camera to provide optimum usage has been difficult when using prior art devices. Therefore, while some degree of improvement is provided by camera viewing heretofore used, none of these systems provide an adequate system for reliable and extended usage.

Thus, there is a pressing need for reliable and safe viewing units that provide optimum lighting and remote viewing wherein the camera and lighting means are directed internally from the same port and same unit.

SUMMARY OF THE INVENTION

It is therefore an object of this invention to provide a light-viewing unit devoid of the above-noted disadvantages.

Another object of this invention is to provide a safe light-viewing unit wherein viewing and illumination are maximized.

A further object of this invention is to provide a remote viewing unit where the light and camera are directed to the same locations within the vessel.

A still further object of this invention is to provide a viewing means wherein the light source output is optimized to allow little if any lost or reflected light.

A still further object of this invention is to provide a single unit containing both the viewing and lighting means and adapted to fit as a unit into a single port of a vessel.

Another still further object of this invention is to provide a combined light-camera unit wherein the heat generated by the light source is easily dissipated without externally. Thus, the heat does not adversely affect the internal temperature of the camera housing, process or obstruct the front lens.

Yet another object of this invention is to provide a light-viewing unit wherein means are included to eliminate light reflection, washout or flooding.

These and other objects are accomplished in accordance with this invention by a light-view unit that will fit into any standard port opening in processing vessels. This unit comprises at its forward or front terminal section a fuseview laminated window as disclosed in U.S. Pat. No. 4,809,862. The laminate is attached over the fused lens of the camera front cap. The laminate can be glass, acrylic, teflon, quartz or any other suitable material. Also, the laminate may not be needed if a fuseable material is used. Positioned behind the fused lens is the camera lens and light means such as a glass acrylic light pipe or a fiber optic bundle. More than one light pipe or fiber optic bundle or mixture of these can be used as the light means. The light pipe used is similar to that of U.S. Pat. Nos. 3,813,514 and 4,746,178. The fiber optic lighting means are similar to those disclosed in the AMP Inc. Catalog No. 88-812. Any other suitable fiber optic lighting means may be used if desirable. The clear fused window is fused on a metal frame forward surface of the unit and the camera and light means clearly viewed therethrough. Both the seeing camera and the light means adjacent thereto are pointed in the same direction and emit from the same laminated window thereby providing lighting of the same object or area being viewed by the camera. Thus, the camera viewer and the light are directed internally from the same vessel port and connection.

This invention provides an optimum viewing/illumination arrangement where, as noted, camera and light were directed internally from the same vessel connection. As two separate entities, an 8-inch nominal port size was required to accomplish this goal. This, however, is not a commonly available port size for existing vessels and is expensive and space consuming for new fabrications. The use of a light pipe, rigid or flexible, allowed the light and camera of the unit of this invention to be connected. In rigid form, the light pipe extends down from the back cap where the light is connected, past the camera to a front locking ring assembly. The locking ring serves several purposes:

(a) to position light pipe and camera lens at fused lens so that view and illumination are maximized;

(b) Locking ring provides a separation between light pipe and camera and serves as a spacer to prevent reflected light from the fused lens access to the camera lens. This prevents washout and also redirects reflected light back into the tank.

(c) Locking ring also features a snap-in/snap-out mount for the camera. This modular design allows for easy assembly or replacement in the field. The camera lens package is inserted into a bored hole in the ring. Spring plungers are drilled into the diameter of the bore. As the lens is inserted, the spring plungers deflect back and allow the lens to enter the bored hole. When the lens is inserted to the point where the spring plungers are aligned with a machined groove in the front cap, they extend and lock the lens into position with enough force to provide stability and alignment but not enough to prevent removal.

For smaller vessel connections, 2-inch nominal and smaller, a flexible, fiber optic bundle is used to transmit light. Where small connections are used, space inside the camera housing is limited. The fiber optic bundle is used to wrap around the camera and lens and into the locking ring. This bundle is also easily redirected when very short camera focal lengths are present (i.e. particle sizing applications where camera is in focus at or near the fused lens surface). This also allows light to be mounted in the side of the camera housing.

The advantage that these light pipes provide is the thermal separation of the light and camera housings. Even though the two are attached, only light is transmitted into and through the camera housing and into the vessel. The heat generated by the light source is dissipated as if it were standing alone. It does not enter the camera housing through the light pipe connection. If this were the case, external cooling would be required to cool the camera electronics sufficiently to prevent overheating and loss of visual contact with the process being monitored. The rigid light pipe is preferred due to the fact that it transmits more light to the vessel interior.

Another feature of the invention and a further embodiment relates to small vessel port size applications. The fuse 'n fuse style (meaning a fused window with a fused ring therein) of fused window has been developed to eliminate reflection of light into the camera lens from the fiber optic bundles. Where mountings are small, the fiber optic bundle and the camera lens will be very close together. The locking ring cannot prevent unwanted reflection as is the case in the larger sized connections. To prevent this situation, a metal, ceramic, graphite, dye or any opaque, light-blocking material ring is fused into the fuseview front cap of the camera. This prevents light from reflecting off the far surface of the fused cap and back into the camera lens, thus preventing washout. At the same time, it allows full transmission of light and an unrestricted view of the internal process. It is critical to the present invention to use this fused metal or ceramic ring when a fiber optics light means is used.

Another feature of this invention is the ability to provide a tubular extension to the front cap to view inside of tanks that are jacketed or are lined internally (i.e. thick refractory in a combustion chamber) by moving the fused window (or fuse 'n fuse window—meaning a fused window with a fused ring therein) to the end of the extension. Insertion optics can be fitted to the camera to extend down to the fused lens where a view of the process can be captured and transmitted back to the camera. The fiber optic bundle fits around the camera and extends down along the insertion optical package to provide light when necessary to view the process.

BRIEF DESCRIPTION OF THE DRAWING

FIG. 2 is a plan side view of a flanged style light-viewing unit of this invention using fiber optic bundles as the lighting means.

FIG. 5 is a plan view of the light-viewing unit of this invention with an extension or insertion well for deeper penetration into a vessel.

FIG. 6 is an expanded perspective view of the front portion of the unit of FIGS. 3-5 illustrating the location of the fused ring in the fused lens.

DETAILED DESCRIPTION OF THE DRAWINGS AND PREFERRED EMBODIMENTS

Figure 1:
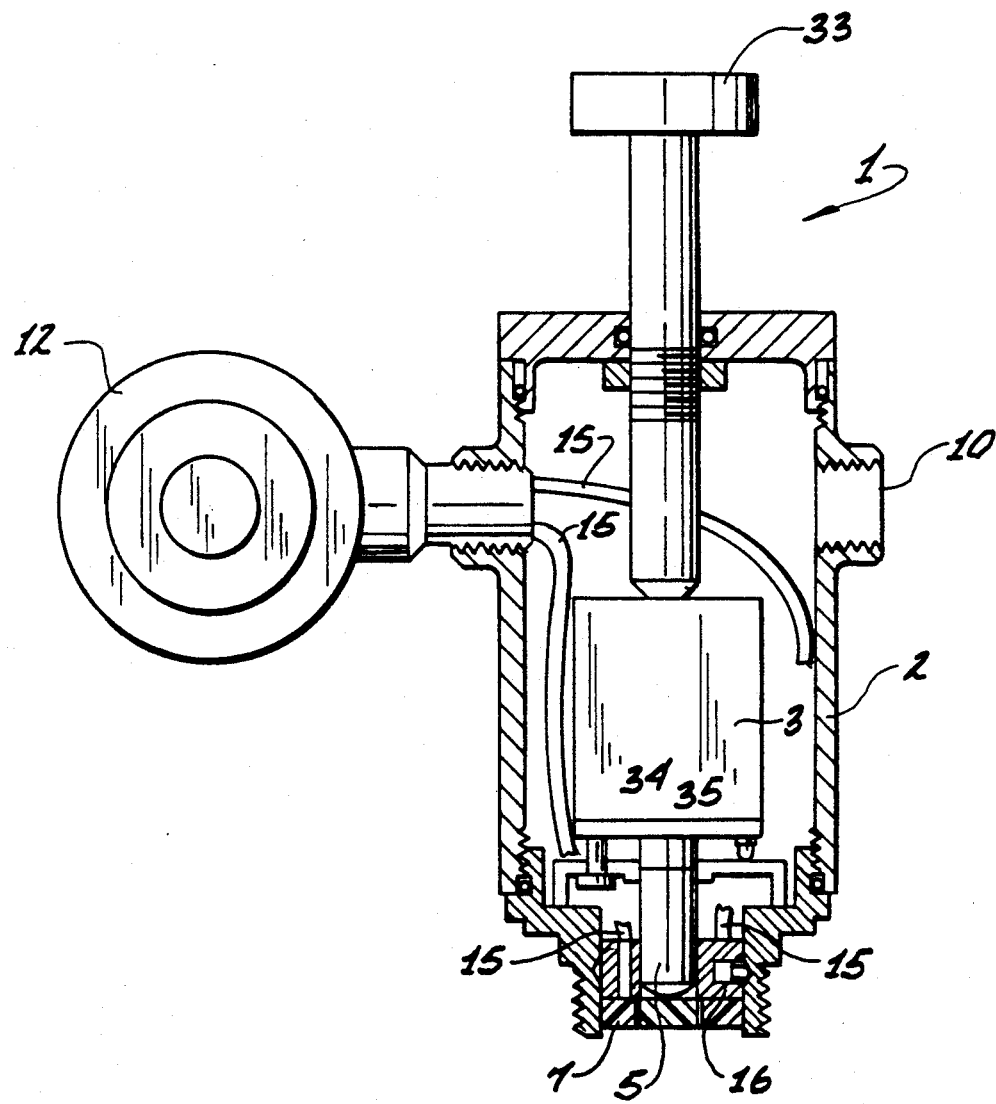
FIG. 1 is a plan side view of a flanged style light-view unit of this invention using a light pipe as the lighting means.

In FIG. 1 the light-viewing unit 1 of this invention comprises a housing 2 into which a camera 3 and light pipe 4 are contained. The front portions of camera 3 and light pipe 4 are designated as 5 and 6 respectively. The camera front portion or camera lens holder 5 and front 6 of light pipe 4 contact the inner face of fused lens 7. The outer face of fused lens 7 and camera front cap 8 are overcoated with a laminated overcoating 9. This overcoating 9 protects against corrosion due to vessel internal chemicals or conditions. This lens 7 and overcoating 9 type structure is discussed in detail in U.S. Pat. Nos. 4,809,862 and 4,977,418. The camera unit 3 used is a CCD Camera (Charged Coupled Device). A typical CCD camera useful in this invention is Sony Camera Model No. XC-711. The light-viewing unit of this invention includes the housing 2 which is a hermetically-sealed housing which is explosion-proof into which camera 3 and any lighting means are housed. At the front end of housing 2 is positioned any suitable mounting means to attach the housing to a vessel whose interior portion is to be viewed. Typical attachment means and the manner of attach-positioning on a vessel to be viewed are disclosed in U.S. Pat. Nos. 4,809,862 and 4,977,418. Within the front end or cap 8 of housing 2 is positioned a fused lens or window 7 through which the camera 3 will view the interior of the vessel. This lens 7 is a fused high pressure lens where the glass is fused to the metal (or other) housing front or cap 8. The lens 7 can be 5 made from any suitable material such as inorganic glasses, acrylics, other polymeric materials, boron glass or other suitable optically-clear materials. The housing 2 can be constructed of metal such as aluminum, other metals, or synthetic materials that have the necessary strength. In all the figures of the drawing the front fused lens 7 is overcoated or laminated as is cap 8 with a laminated overcoating 9 as described in U.S. Pat. Nos. 4,809,862 and 4,977,418. Rather than lamination other coating techniques can be used in this invention. Examples of materials that can be used in coating are quartz, sapphire, Teflon (trademark of du Pont) or other transparent ceramics. In housing 2 are openings 10 through which camera adjusting means and power connecting means may be connected to the unit internal of housing 2. The video connector 11 is shown where it can receive power connections via openings 10. A light source 12 which transmits the light through light pipe 4 is shown external of housing 2, however, it can be internal, if required. The light source 12 and light pipe 4 as a light means is discussed in Applicant's U.S. Pat. No. 4,746,178. A similar light pipe 4 is used in the present system as in said patent. The vessel wall 13 and flange 14 through which unit 1 fits is shown, however, unit 1 can also fit on the wall by any other convenient means. All of the embodiments of FIGS. 1-7 may be connected to a vessel wall by any conventional means such as bolts, welding, screwing into, by clamping such as with tightening flanges and the like are similar to the means described in U.S. Pat. Nos. 4,809,862 and 4,977,418.

By providing the camera light-viewing system of the present invention with same directional light pipe 4, the following advances over the art and advantages are accomplished:

(a) Fused glass to metal sealed front plano-plano lens. Hermetically sealed does not allow any vapors to enter the housing 2.

(b) O-ring sealed fuseview lens holder to metal (or plastic) house. A rear O-ring threaded seal cap keeps water and moisture out of the housing. The threaded engagement has the strength and integrity needed to prevent an internal explosion from breaking the housing apart and the threading keeps the flames from propagating out, thereby making unit explosion-proof without purging. The O-ring sealed housing makes it also Nema 4 weatherproof. The fuseview (fused glass to metal sealed lens) will withstand an internal explosion along with maintaining a hermetic, gasketless seal. An O-ring is a self-energizing seal (meaning virtually no torque or force is required to "seat" the O-ring) that has a circular cross section and is made of an elastomeric material (an elastomer material is one that can be compressed and then released and after it is releaed it will return to its original shape). The O-ring groove used in this invention is a standard design. Nema 4 is an area classification for electrical enclosures. A Nema 4 enclosure is suitable for outdoor use and areas where it may be washed down with water. Nema is a standard electric code that has numerals to designate set electrical standards.

(c) Focusing of the vision system CCD Camera or other style imaging device can be performed external to the housing through the rear focusing screw. This threaded focusing screw pushes continually on the camera since the camera is spring mounted in the front on slide bearings. This concept is unique since most cameras are focused by moving the lens package back and forth. In the present invention it is extremely important to maintain the lens distance as close to the front fused lens as possible in order to maximize the viewing angle. If the lens retracts the view angle retracts and has a potential to interfere with the wall of the fuseview (or pressure vessel wall). This eliminates the need to open the housing of the present invention which could cause an accident, explosion or allow vapors to attack the unit.

(d) The spring-loaded bearing mount CCD Camera allows a servo motor, drive motor, hydraulic operator or air operation to move the lens the required distance for focusing remotely instead of using the focusing screw.

(e) The front alignment plate carries the slide bearing mount. It also serves as a mounting plate for the lens cartridge on the explosion-proof camera. This plate is mounted by two screws in slotted holes. By loosening the screws the CCD Camera (or any other imaging device) can be rotated relative to the view object. This creates the proper image orientation on the monitoring screen. This plate also keeps the lens assembly at the optimum fixed position.

(f) A telephoto lens that is manually or electrically driven external the housing and can be used keeping the integrity of the housing intact. One can attach the center focusing lens to the CCD while fixing the remaining lens to the alignment plate or fused lens assembly. To focus a telephoto lens a center (lens located in the middle) needs to be moved relative to the lens assembly in front and the lens assembly behind. In a standard design it is easy to accomplish this. Anyone using this system can adjust the lens by rotating the body. In the present invention, the adjusting lens is fixed to the camera body. This moves this lens with the camera and keeps the other stationary. A bracket spanning the camera can be used if zoom lens is used once it is focused.

Figure 3:
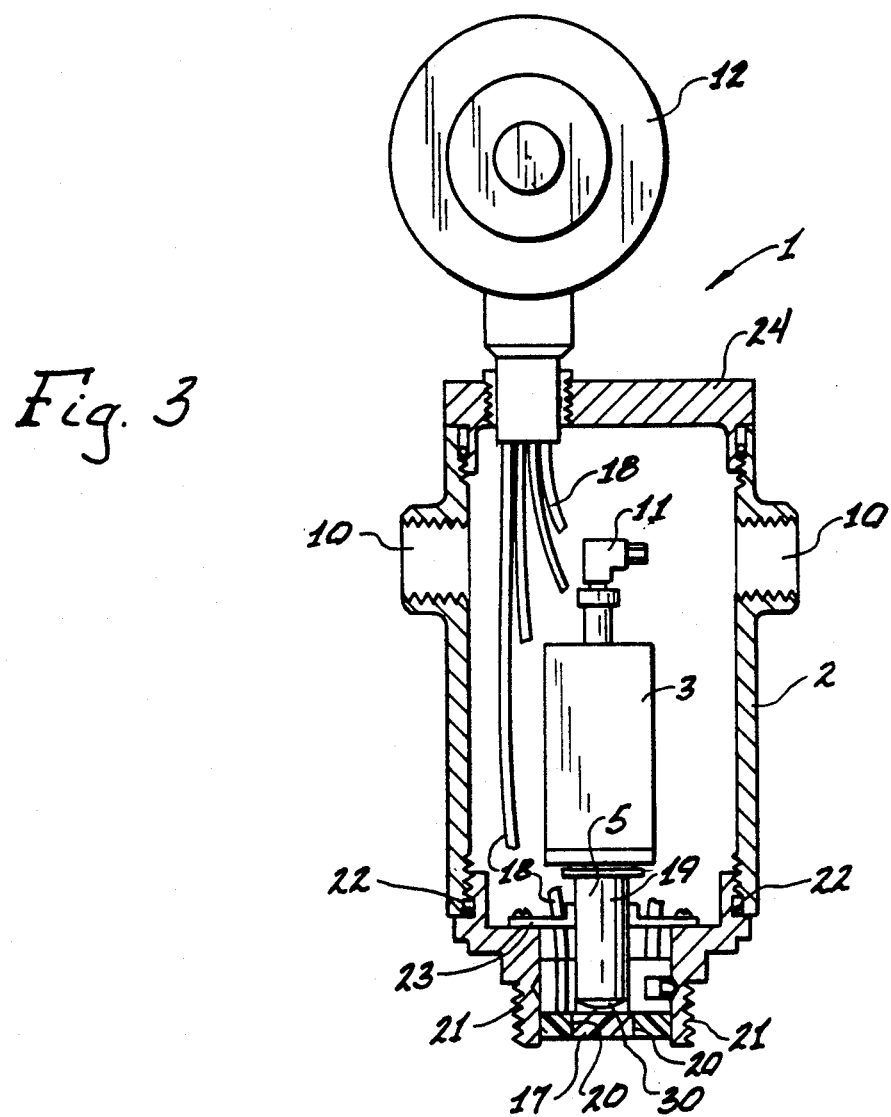
FIG. 3 is a plan side view of the light-viewing unit of this invention used for smaller vessel openings and using fiber optic bundles as the lighting means.
Figure 4:
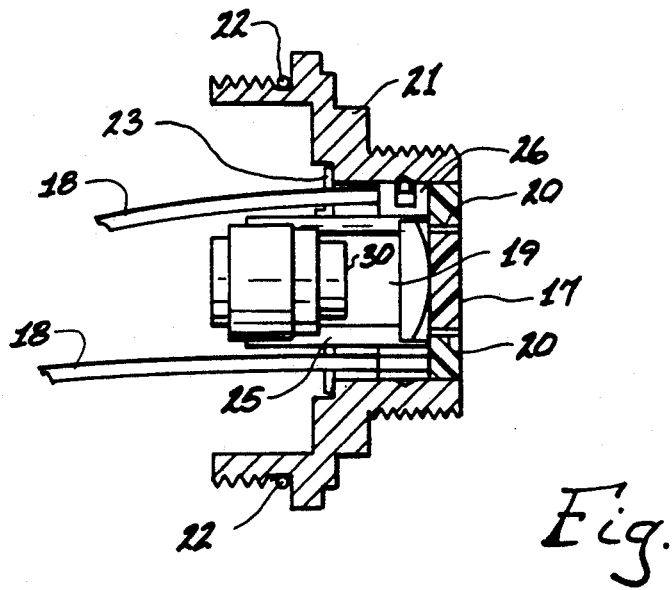
FIG. 4 is a plan view of the front section of the light viewing unit of this invention using a fused ring to prevent light reflection or washout which could interfere with the camera-viewing means.

In FIG. 2 the same light-viewing unit 1 as in FIG. 1 is illustrated except that the lighting means in FIG. 1 is a light pipe 4 and in FIG. 2 the lighting means is a fiber optic bundle 15. In all the embodiments of this invention at least one lighting means is used; in some instances more than one lighting means may be desirable. The unit 1 of this invention is connected to a reaction or other vessel by the same manner and means described in U.S. Pat. Nos. 4,809,862 and 4,977,418. The flange style light/camera system or unit of FIGS. 1 and 2 is generally used for larger vessel port openings such as those ports having openings of about 3-inch diameters or greater. The threaded connection style light/camera system or unit of FIGS. 3-5 is used for smaller vessel connections, for example, where the diameter of the port opening is two inches or smaller. For these smaller installations a flexible fiber optic bundle 15 is used to transmit the light. Where small connections are used, space inside the camera housing is somewhat limited. The fiber optic bundle 15 is used to wrap around camera 3 and into the locking ring 16. This bundle 15 is also easily redirected when very short camera focal lengths are present (i.e. particle sizing applications where camera 3 is in focus at or near the fused lens 7 surface). Fiber optic bundle 15 should extend from light source 12 to the upper surface of lens 7 and in contact therewith. This also allows light to be mounted in the side of the camera housing. It is critical to this invention that the lighting means and the viewing means (camera) be pointed or directed in substantially the same direction so that the camera can see the desired portion of the vessel interior that is best illuminated. Using as in the prior art two ports, one for the camera and one for the lighting means, or using one-half port (the bottom half, for example) for the camera and the remaining half port (the top half) for the lighting directs each in different directions and optimum viewing is not achieved. The lighting means 15 and camera lens 5 can be sufficiently separated to prevent reflection from any glass surface associated with lens 7 and laminate 9 to enter the camera and cause washout of the camera device with light to the point where the viewing monitor shows a white screen with little or no detail of the field of view. The monitoring system is similar to that used in U.S. Pat. Nos. 4,809,862 and 4,977,418.

In FIG. 3 in this embodiment, the space immediately behind the fused lens 17 is limited. Flexible fiber optic bundles 18 are used to be able to provide light through the fused lens 17. Since these bundles 18 and the camera lens 19 cannot be sufficiently separated, reflection off glass surfaces associated with the fused lens 17 would cause washout if not for the presence of the fused-in ring 20. This ring 20 is fused directly into the fused lens 17 and creates a center and outer portion of fused lens. It does not allow light to reflect off the glass surfaces and back into the camera lens 19. Its diameter is variable and depends on the diameter of the lens used as well as its angle of view. It cannot be too small in diameter that it causes an obstruction to the view and it cannot be too big that it does not confine light to the outer portion of the fused glass. It can be made of a wide range of materials which limit light transmission. The front cap 21 screws into the port opening in the vessel and directs both the light and camera view to the same locations or areas interior of the vessel. The lens 17 is constructed as disclosed for the construction of element 7 of U.S. Pat. No. 4,977,418 and element 4 of U.S. Pat. No. 4,809,862. Fused ring 20 of FIG. 3 is shown in detail in FIG. 6 herein. O-rings 22 are used to impart greater sealing to the connection of front cap 21 to the lower portion threaded of housing 2. The retaining bracket 23 holds the camera 3 in position and prevents any substantial movement thereof. As in the other figures herein, the front of the unit 1 fits into and/or mounts directly in the wall of a vessel. In FIG. 3 the camera front cap 21 mounts directly to the vessel. This can be done through a fuseview laminated window (U.S. Pat. No. 4,809,862) fused window without laminate, triclamp fuseview, threaded (NPT or straight) fuseview, the camera and housing mount as shown on the drawing and as described in U.S. Pat. No. 4,977,418. The light 18 is mounted through a side port or through the back cap 24 of housing 2. The connection is through a 1-inch NPT, fiber optic light pipe 6 (of FIG. 1) or connector. The light in this figure is then conveyed to the front cap 21 via a fiber optic bundle 18 or a rigid light pipe 6 of FIG. 1. Lens holder or retaining bracket 23 holds lens and bundle or light pipe in place for illumination and viewing in the same direction.

FIG. 4 shows an enlarged view of the front portion of unit 1. Camera lens holder 25 maintains the camera view steady in lens housing 19 and is directed in the center of fused ring 20 toward substantially the same direction as the light emitted from light means 18. Optic bundle holder 26 holds optic bundle 18 in position so that it emits light in the same direction as the camera view.

In FIG. 5 a tube 27 is welded onto the front cap 21 at point 29 to provide an insertion lens 28 that extends past the mounting point internally until the open interior of the vessel is reached. In this embodiment the fused lens 17 with the fused ring 20 are located downward at the terminal front end of unit 1. An elongated insertion camera lens 28 is housed in this extension 27. The camera 3 is fitted with insertion optics to gain an image at the fused window 17 and transmit it back to the camera 3. For illumination the fiber optic bundles 18 are run down the tube 27 around the insertion lens 28 to the fused window 17. This configuration would normally cause light reflection into the lens 28 and washout the picture or image but the fused ring 20 keeps light reflection away from the lens and reflects it into the vessel being viewed. The diameter of the fused ring 20 must be at least as large as the diameter of the camera lens or camera lens viewing portion 30 so that ring 20 permits maximum viewing by the camera and maximum shielding (of the camera lens 19 or 30) from the light pipes in this figure the light emitting fiber optic bundle 18. The camera 3 can be focused from the outside by means disclosed in U.S. Pat. No. 4,977,418.

In FIG. 6 most elements of the unit 1 as shown in FIGS. 3-5 are not illustrated so that the positioning of fused ring 20 in the fused window 17 can be clearly shown. FIG. 6 is an enlarged front section of the embodiment of FIG. 5. As earlier noted, the light will be emitted through fused window 17 at locations 31 and the camera lens 19 will view through window 17 at location 32 within the inner portion of fused ring 20. Thus, ring 20 shields the camera view from light reflection or washout from the light emitted therefrom. The ring 20 is only used in embodiments of this invention where the lens and light bundles are in close enough proximity to each other to permit reflected light to enter the lens and impair the quality of view.

In FIG. 7 unit 1 is shown having an external adjusting screw 33. Focusing of the vision system CCD Camera 3 or other style imaging device can be performed external to the housing through the rear focusing screw 33. This threaded focusing screw 33 pushes continually on the camera 3 since the camera 3 is spring 35 mounted in the front on slide bearings 34. There are generally four or more adjustable slide bearings 34 but for clarity only one is shown in the drawing. This concept is unique since most cameras are focused by moving the lens package back and forth. In the present invention it is extremely important to maintain the lens 5 distance as close to the front fused lens 7 as possible in order to maximize the viewing angle. If the lens retracts the view angle retracts and has a potential to interfere with the wall of the fuseview (or pressure vessel wall). This eliminates the need to open the housing 2 of the present invention which could cause an accident, explosion or allow vapors to attack the unit. The spring-loaded bearing mount CCD Camera 3 allows a servo motor, drive motor, hydraulic operator or air operation to move the lens 5 the required distance for focusing remotely instead of using the focusing screw.

The preferred and optimumly preferred embodiments of the present invention have been described herein and shown in the accompanying drawings to illustrate the underlying principles of the invention but it is to be understood that numerous modifications and ramifications may be made without departing from the spirit and scope of this invention.

What is claimed is:

1. A light-viewing unit adapted to be connected to a processing vessel comprising in combination a housing, means for attachment of said housing to said vessel, a substantially clear fused window, light-emitting means and a camera-viewing means, said clear fused window fused into a front portion of said housing, positioned in said housing behind said clear fused window is said light-emitting means and said camera-viewing means, said light-emitting means capable of illumination of an interior of said vessel through said clear fused window, said camera-viewing means capable of viewing an interior of said vessel through said clear fused window, said clear fused window fused to said front portion of said housing forming thereby a substantially corrosion-proof seal across an entire distal end portion of said unit, said light-emitting means and said camera-viewing means pointed into said vessel in substantially the same direction.

2. The unit of claim 1 wherein an upper portion of said housing is adapted to be connected to a source of power.

3. The unit of claim 1 wherein an upper portion of said housing contains a light source and wherein a distal end portion of said housing is adapted to be connected to said vessel in a substantially airtight manner.

4. The unit of claim 1 wherein said light-emitting means is a light pipe.

5. The unit of claim 1 wherein said light-emitting means is a fiber optics bundle.

6. The unit of claim 1 wherein said light-emitting means and said camera-viewing means are located at substantially the same plane within said front portion of said housing.

7. The unit of claim 1 wherein said camera-viewing means and said light-emitting means are located on about the same plane as a wall of said processing vessel.

8. The unit of claim 1 wherein said camera-viewing means and said light-emitting means are positioned so as to extend substantially within an interior of said processing vessel.

9. The unit of claim 1 wherein said light-emitting means has an index of refraction substantially equal to that of said fused window.

10. A light-viewing unit for supplying illumination and viewing an interior of a processing vessel which comprises in combination a housing, means for attachment of said housing to an opening in said processing vessel, a substantially clear fused window, light-emitting means and a camera-viewing means, a front terminal portion of said light-emitting means and a lens portion of said camera-viewing means positioned in said housing in a front portion for visable transmission through said clear fused window, said light-emitting means capable of illumunation of an interior of said processing vessel through said clear fused window, said camera-viewing means capable of viewing an interior of said processing vessel through said clear fused window, said clear fused window fused to said front portion of said housing forming thereby a substantially corrosion-proof seal across an entire distal end front portion of said housing, said light-emitting means and said camera-viewing means pointed into said vessel in substantially the same direction.

11. The unit of claim 10 wherein a ring is fused into said clear fused window, said ring having a diameter at least as great as the diameter of said lens portion of said camera.

12. The unit of claim 10 wherein an upper portion of said housing is adapted to be connected to a source of power.

13. The unit of claim 10 wherein an upper portion of said housing contains a light source and wherein a distal end portion of said housing is adapted to be connected to said vessel in a substantially airtight manner.

14. The unit of claim 10 wherein said light-emitting means is a light pipe.

15. The unit of claim 10 wherein said light-emitting means is a fiber optics bundle.

16. The unit of claim 10 wherein said light-emitting means and said camera-viewing means are located at substantially the same plane within said front portion of said housing.

17. The unit of claim 10 wherein said camera-viewing means and said light-emitting means are located on about the same plane as a wall of said processing vessel.

18. The unit of claim 10 wherein said camera-viewing means and said light-emitting means are positioned so as to extend substantially within an interior of said processing vessel.

19. The unit of claim 10 wherein said light-emitting means has an index of refraction substantially equal to that of said fused window.

* * * * *